Dec. 21, 1954       M. G. MILLER       2,697,631
VEHICLE BODY PARTITIONING AND LOAD SECURING DEVICE
Filed April 24, 1952
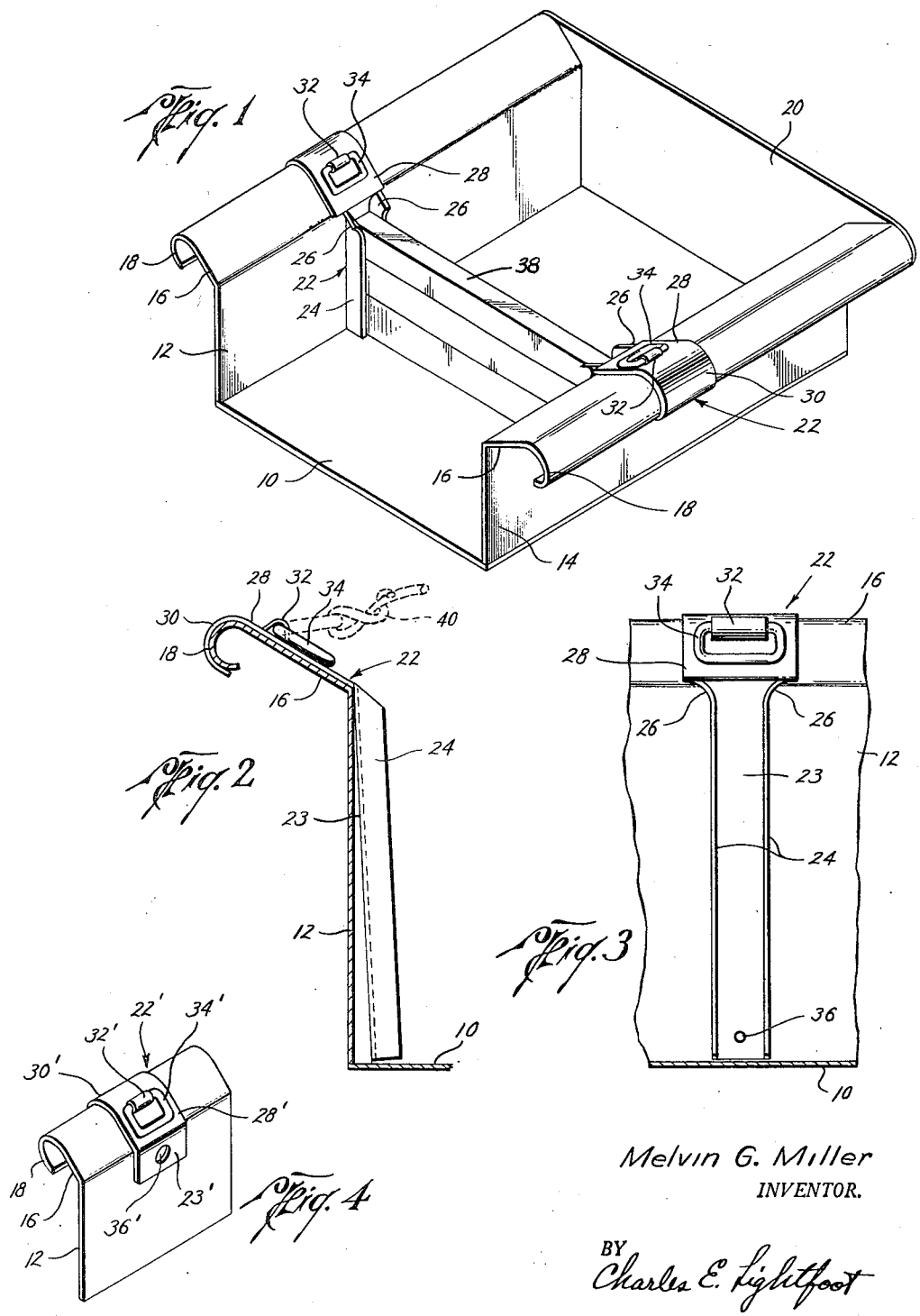
Melvin G. Miller
INVENTOR.
BY Charles E. Lightfoot
ATTORNEY

United States Patent Office 2,697,631
Patented Dec. 21, 1954

2,697,631

VEHICLE BODY PARTITIONING AND LOAD SECURING DEVICE

Melvin G. Miller, Houston, Tex.

Application April 24, 1952, Serial No. 284,039

5 Claims. (Cl. 296—28)

This invention relates to a vehicle body partitioning and load securing device, and more particularly to a device which may be conveniently applied to existing vehicle body structures for the purpose of dividing the same into a number of compartments, and which is also capable of use as a means for securing loads in such bodies.

The invention finds particular application in connection with vehicles of the type known as "pickup" trucks, which are commonly provided with tray-like bodies having a continuous smooth interior surface, and formed with sides having outwardly rolled upper marginal portions. Such vehicles are used for a variety of purposes, for which a continuous, uninterrupted interior surface is required, such as in hauling bulk or particulate material, but are also frequently employed under circumstances in which the provision of separate compartments is desirable. Heretofore, however, no completely satisfactory means has been devised for forming partitions within such bodies, at any desired location, without interference with the use of the vehicle for purposes where a continuous, uninterrupted interior surface is needed.

The present invention has for its principal object the provision of an attachment for vehicle bodies of the type referred to by which partitions may be positioned therein at any desired location, and readily removed when not in use, so that no obstruction is presented in the interior surface of the body.

Another object of the invention is to provide an attachment which is adapted to be applied to the sides of vehicles of the type mentioned, whereby a partition may be securely supported in the body at any desired location therein.

A further object of the invention is the provision of a partitioning device which can be removably positioned on the side of a vehicle body of the kind referred to, and which is cooperable with the rolled margin of the side of the body to securely lock the attachment at any desired location, whereby the partition may be immovably secured within the body.

A further object of the invention is to provide a partition-supporting attachment having a curved upper end portion adapted to grippingly engage the outwardly rolled upper margin portion of the side of a vehicle body of the type referred to, and which also has a downwardly extending channel portion located within the body, into which a partitioning means may be inserted to securely hold the same at the desired location.

Another object of the invention is the provision of a load-securing attachment for vehicles of the type mentioned, which is formed to grippingly engage the upper marginal portion of the side of the vehicle, and which includes means for the attachment thereto of a load-securing member by which a load may be held against movement in the vehicle.

A still further object of the invention is to provide a partition-supporting and load-securing attachment for vehicles, which is of simple design and rugged construction, capable of withstanding the hard usage and heavy load conditions to which such a device is likely to be subjected.

A more complete understanding of the nature and scope of the invention may be had from the following detailed description, constituting a specification of the same, when taken in conjunction with the accompanying drawings, wherein—

Figure 1 is a perspective view of a portion of a vehicle body, showing the invention as applied thereto;

Figure 2 is a vertical, cross-sectional view of one side of the body of a vehicle, as illustrated in Figure 1, showing the manner in which the invention is applied thereto;

Figure 3 is a side view of the invention, looking at the right hand side of the device as illustrated in Figure 2, showing the invention as applied to the side of the vehicle body; and Figure 4 is a fragmentary perspective view of one side of a vehicle body, showing a modified form of the invention applied thereto.

Referring now to the drawings in greater detail, the invention in the present illustration is shown as it is applied to a vehicle of the type commonly known as a "pickup" truck, having a body of generally tray-like construction, fabricated of sheet metal and having a bottom 10, and sides 12 and 14 whose upper marginal portions extend outwardly, as indicated at 16, 16 and terminate in the rolled portions 18, 18. In vehicles of this type the cab of the vehicle commonly forms the front wall of the body, not shown, and a back wall 20 is provided which may be secured thereto in any conventional manner, as by hinges, not shown, or otherwise.

The invention may, of course, be applied to other types of vehicle bodies, with equally satisfactory results, and is disclosed herein in connection with a body of the "pickup" type, merely for convenience in illustration.

The invention comprises a partition-supporting and load-securing device, generally indicated at 22, which is formed with a channel-shaped portion 24, having a bottom wall 23 and whose sides 26, 26 are preferably outwardly flared, as indicated at 28, 28 at their upper ends. The upper part of the device is formed with an outwardly extending portion 28, which is a continuation of the bottom wall 23 of the channel and terminates in a curved end portion 30.

A loop 32 is conveniently formed from, or attached to, the portion 28, and extends above the same, which loop carries a ring, 34, or the like, for a purpose later to be made apparent.

The angle between the bottom 23 of the channel portion of the device and the portion 28 thereof is preferably somewhat greater than the angle between the vertical portions 12 and 14 of the sides of the body and the corresponding outwardly extending portions 16, 16 thereof, as will best be seen in Figure 2 of the drawings. A suitable opening 36 may be provided in the bottom of the channel portion of the device, by which the same may be secured to the side of the vehicle by bolting or otherwise, when desired.

The device may be formed of a single piece of sheet material, with the exception of the ring 34, by cutting and shaping the material, and the ring 34 may be afterward inserted in the loop 32.

In making use of the invention as described above, the device is positioned on the side of the vehicle body, by first hooking the curved upper end portion 30, over the rolled portion 18 of the upper margin of the body side, after which the channel portion of the device is moved downwardly inside the body until the outwardly extending portion 28 lies along the outwardly extending marginal portion 16 of the body side. In this condition of the device the channel portion will be in a position such as that illustrated in Figure 2, extending preferably at an angle of about 2 degrees to the adjacent portion of the side of the body. Two such devices are positioned on opposite sides of the body, in the manner described above, at any desired location throughout the length of the body, and partitioning means, such as wooden boards or the like, indicated at 38, of suitable length, may be positioned with their ends extending into the channel portions of the devices, in the manner illustrated in Figure 1, so that the partition thus formed divides the body into separate compartments.

It will be apparent that by making the partition elements 38 of a length nearly equal to the width of the interior of the body, the elements when positioned in the channel portions of the devices will force the same into close contact with the sides of the body, thus exerting a force tending to tighten the curved portions 30 on the rolled portions 18 of the sides of the body, and effectively locking the devices against longitudinal movement on the sides. In this manner the partition will be securely held at the desired location, and prevented from shifting longitudinally of the body.

Should it be desirable to secure a load within the body by means of ropes, straps, or the like, this can be accomplished by passing such securing means through the rings 34 of the devices, in the manner indicated at 40 in dotted lines in Figure 2, whereupon the load may be securely tied to the body. The exertion of a pull on the ring 34 by the load securing means will also effectively maintain the curved portions 30 of the devices securely locked in engagement with the rolled portions 18 of the sides, thus further aiding in preventing any longitudinal shifting of the devices on the sides of the vehicle.

In the event that it should be desired to more permanently secure the devices to the sides of the vehicle bolts or the like may be passed through the openings 36 and through corresponding openings in the sides of the vehicle, whereby the devices may be securely bolted in position.

In Figure 4 there is illustrated a somewhat modified form of the invention, which is intended for use only as a load-securing means. In this form of the invention the device comprises a short vertically disposed portion 23', and an outturned portion 28', terminating in a curved end portion 30'. The portion 28' is formed or provided with a loop 32', extending above the same, through which a ring 34' is extended, and the vertical portion 23' may also have an opening 36' for the reception of securing means, such as a bolt or the like, by which the device may be bolted at any desired location to the side of the vehicle body.

The form of the invention illustrated in Figure 4 is applied to the body of the vehicle in a manner similar to that previously described, the curved portion 30' being placed over the rolled portion 18 of the body side, and the portion 28' lying along the outwardly extending portion 16 of the body side, with the vertical portion 23' extending downwardly in contact with the vertical portion of the vehicle side. By so applying two such devices to the opposite sides of the vehicle, any suitable load securing means, such as a rope, strap, chain or the like may be attached to the rings 34' and employed to securely fasten the load within the body. The application of a pulling force to the rings 34' by such load securing means results in firmly binding the devices in contact with the sides of the vehicle body, thus effectively preventing longitudinal shifting of the devices.

As many pairs of the devices may be applied to the vehicle body as may be desired, in order to provide the desired number of compartments within the body, or to accommodate as many securing means as may be needed to maintain the load against shifting.

It will be apparent that the devices are easily applied and removed from the vehicle, so that when the vehicle is to be used for hauling bulk or particulate material no obstruction is presented to the continuous, uninterrupted interior surface of the body.

The invention, as described above, provides a partition-forming and load-securing device which is of simple design, easily and economically manufactured, and by which the utility of vehicle bodies of the type referred to is greatly enhanced.

The invention has been described in connection with certain specific embodiments of the same, which are intended by way of illustration only, and it is to be understood that numerous changes can be made in the form of the device, as well as the materials from which it is fabricated, without departing from the spirit of the invention, or the scope of the appended claims.

Having thus clearly shown and described the invention, what is claimed as new and desired to secure by Letters Patent is—

1. A vehicle body attachment for use with a vehicle body whose side walls are formed with substantially vertically disposed lower portions and outwardly flared upper portions terminating in outwardly rolled top margins, said attachment comprising a member having an upright portion adapted to be positioned adjacent the lower portion of a side wall of the body and an upper portion engageable with the outwardly flared portion of said wall, said upright portion being disposed at a greater angle to said lower portion of said member than the angle between the upper and lower portions of said wall, and said member having an outwardly curved portion engageable over the outwardly rolled margin of said side wall and positioned to clampingly engage said margin when said lower portion of said member is moved into engagement with said side wall.

2. A vehicle body attachment for use with a vehicle body whose side walls are formed with substantially vertically disposed lower portions and outwardly flared upper portions terminating in outwardly rolled top margins, said attachment comprising a member having an upright channel portion adapted to be positioned within the body with the outside face of the web of the channel adjacent the lower portion of a side wall of the body, said member having an outwardly extending portion engageable with the outwardly flared portion of said wall, said outside face being disposed at an angle to said outwardly extending portion which is greater than the angle between said lower portion and said outwardly flared portion of said wall, and said member having an outwardly curved portion engageable over the outwardly rolled margin of said wall and positioned to clampingly engage said margin upon movement of said web into engagement with said wall.

3. A vehicle body attachment for use with a vehicle body whose side walls are formed with substantially vertically disposed lower portions and outwardly flared upper portions terminating in outwardly rolled top margins, said attachment comprising a member having an upright channel portion adapted to be positioned within the body with the outside face of the web of the channel facing the lower portion of a side wall of the body, said member having an outwardly extending upper portion positioned to engage the outwardly flared portion of said wall and terminating in an outwardly curved portion engageable over the outwardly rolled margin of said wall, said web being disposed at an angle to said outwardly extending upper portion greater than the angle between the upper and lower portions of the wall, whereby said outwardly curved portion of said member will be caused to clampingly engage said outwardly rolled margin when said web is moved into engagement with said wall.

4. A vehicle body attachment for use with a vehicle body whose side walls are formed with substantially vertically disposed lower portions and outwardly flared upper portions terminating in outwardly rolled top margins, said attachment comprising a member having an upright channel portion adapted to be positioned within the body with the outside face of the web of the channel facing the lower portion of a side wall of the body, said member having a widened outwardly extending portion above said channel portion positioned to overlie the outwardly flared portion of said wall and terminating in an outwardly curved portion engageable over said outwardly rolled margin of said wall, said web being disposed at an angle to said widened portion greater than the angle between the upper and lower portions of the wall and said outwardly curved portion being positioned to clampingly engage said outwardly rolled margin when said web is moved into engagement with said wall.

5. A vehicle body attachment for use with a vehicle body whose side walls are formed with substantially vertically disposed lower portions and outwardly flared upper portions terminating in outwardly rolled top margins, said attachment comprising a member having an upright channel portion adapted to be positioned within the body with the outside face of the web of the channel facing the lower portion of a side wall of the body, said member having a widened outwardly extending portion above said channel portion positioned to overlie the outwardly flared portion of said wall and terminating in an outwardly curved portion engageable over said outwardly rolled margin of said wall, the flanges of said channel portion being oppositely outwardly flared at their upper ends, said channel portion being disposed at an angle to said outwardly extending portion greater than the angle between said upper and lower portions of the wall and said outwardly curved portion being clampingly engageable with said outwardly rolled margin when said web is moved into engagement with said wall.

(References on following page)

References Cited in the file of this patent

UNITED STATES PATENTS

| Number | Name | Date |
|---|---|---|
| 105,714 | Milner | July 26, 1870 |
| 991,792 | Lawler et al. | May 9, 1911 |
| 1,229,589 | Davis | June 12, 1917 |
| 1,388,008 | Taylor | Aug. 16, 1921 |
| 1,764,615 | Edwards | June 17, 1930 |
| 2,223,577 | Renno | Dec. 3, 1940 |